K. SHANK.
ROTARY INTERNAL COMBUSTION ENGINE.
APPLICATION FILED NOV. 11, 1918.

1,318,017.

Patented Oct. 7, 1919.
4 SHEETS—SHEET 1.

WITNESSES

INVENTOR
Keller Shank.
BY
ATTORNEYS

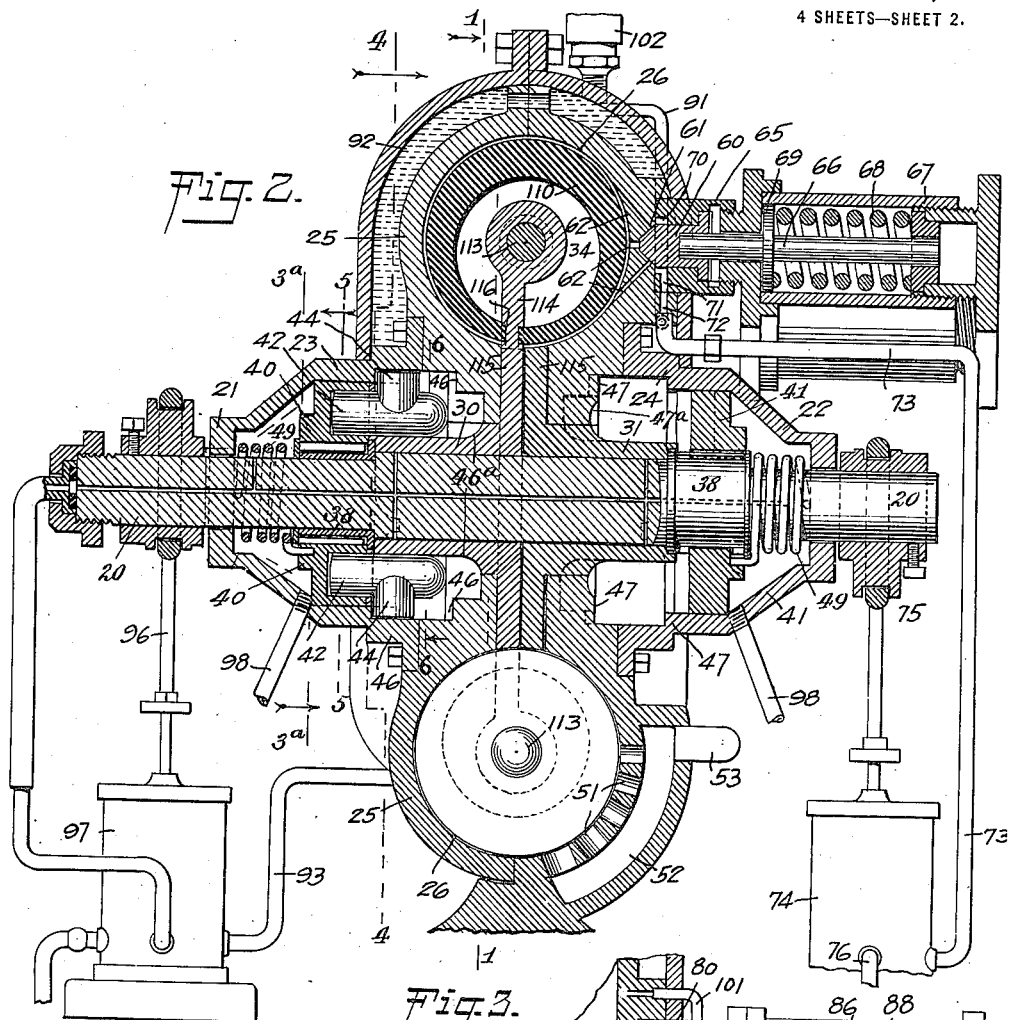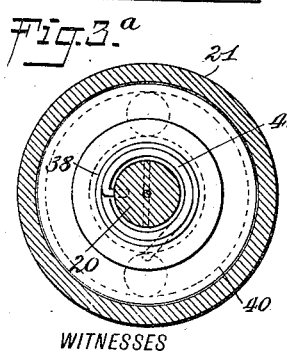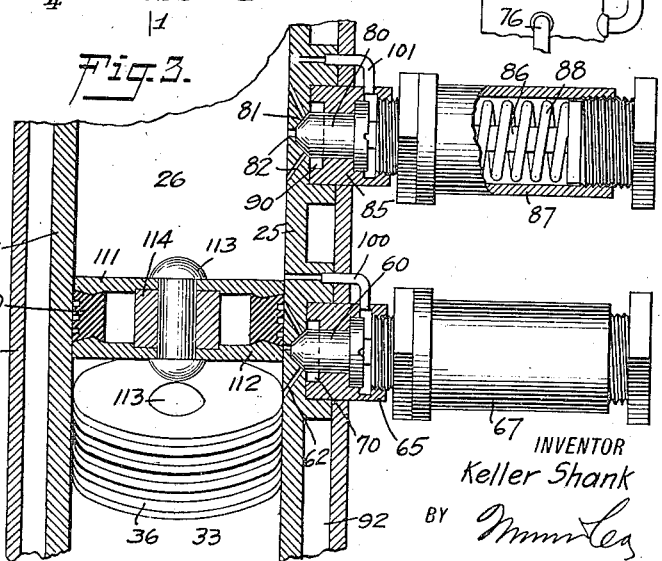

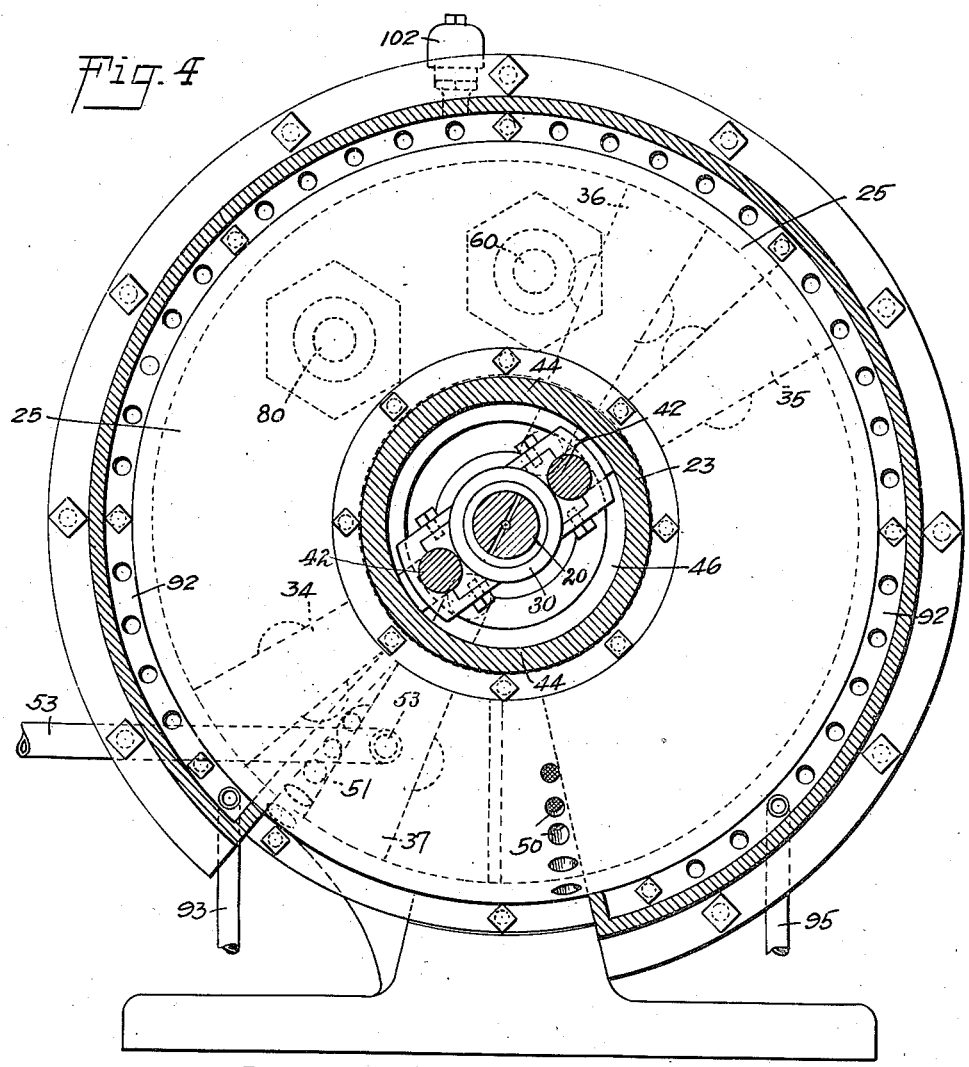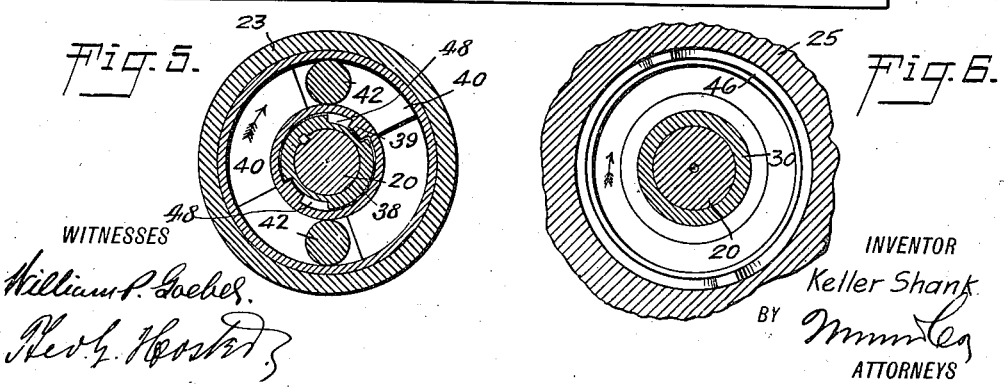

K. SHANK.
ROTARY INTERNAL COMBUSTION ENGINE.
APPLICATION FILED NOV. 11, 1918.
1,318,017.
Patented Oct. 7, 1919.
4 SHEETS—SHEET 4.
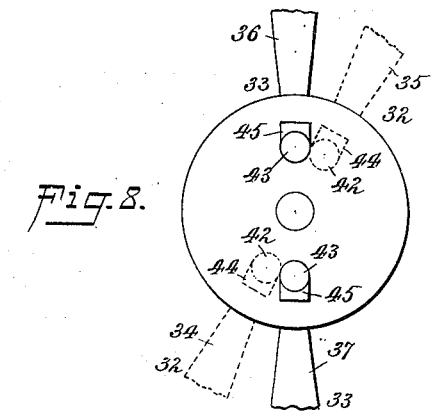
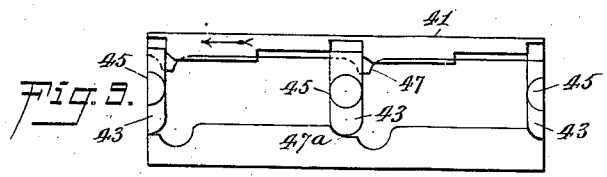
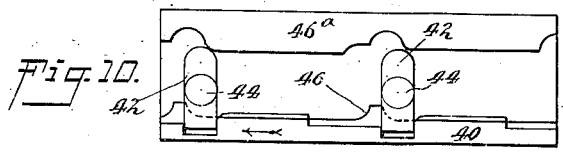
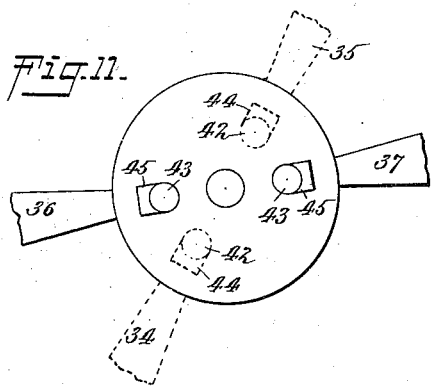
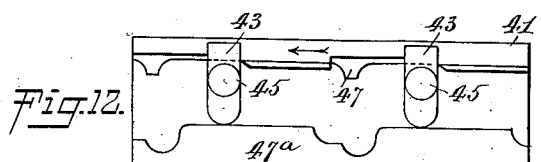
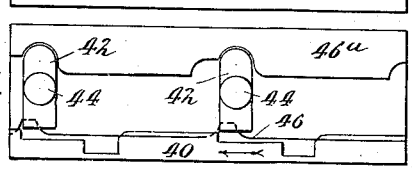
WITNESSES
INVENTOR
Keller Shank
BY
ATTORNEYS

UNITED STATES PATENT OFFICE.

KELLER SHANK, OF THE UNITED STATES ARMY.

ROTARY INTERNAL-COMBUSTION ENGINE.

1,318,017.   Specification of Letters Patent.   Patented Oct. 7, 1919.

Application filed November 11, 1918. Serial No. 261,979.

*To all whom it may concern:*

Be it known that I, KELLER SHANK, of the United States Army, and a resident of Fortress Monroe, in the county of Elizabeth City and State of Virginia, have invented a new and Improved Rotary Internal-Combustion Engine, of which the following is a full, clear, and exact description.

The invention relates to internal combustion engines of the rotary type and using liquid gasolene or other hydrocarbon oils as fuel combined with compressed air and steam to form the motive agent.

The object of the invention is to provide a new and improved rotary internal combustion engine which is completely balanced and exceedingly powerful without requiring an undue increase in the size of the parts of the engine. Another object is to subject the rotor of the engine to, at least, two impulses for each revolution of the engine shaft.

With these and other objects in view the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Fig. 2 is a sectional side elevation of the same on the line 2—2 of Fig. 1;

Fig. 3 is a sectional plan view of the same on the line 3—3 of Fig. 1;

Figure 7:
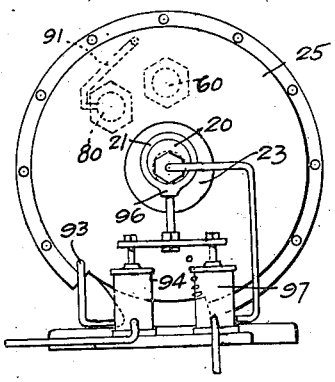

Fig. 3ª is a cross section of the same on the line 3ª—3ª of Fig. 2;

Fig. 4 is a cross section of the same on the line 4—4 of Fig. 2;

Fig. 5 is a similar view of the same on the line 5—5 of Fig. 2;

Fig. 6 is a like view of the same on the line 6—6 of Fig. 2;

Fig. 7 is a reduced elevation of one end of the rotary internal combustion engine;

Fig. 8 is a side elevation of the rotors, one being shown in full lines and the other in dotted lines;

Figs. 9 and 10 are developed views of the locking and releasing mechanisms for connecting and disconnecting the rotors with the main shaft of the engine;

Fig. 11 is a side elevation of the rotors in different position from the one shown in Fig. 8; and Figs. 12 and 13 are developed views of the locking and releasing mechanisms in the position for the rotors as shown in Fig. 11.

The engine shaft 20 is journaled in suitable bearings 21 and 22 attached to or forming part of the heads 23, 24 of the cylinder 25, and the latter is provided with an annular working chamber 26 preferably made circular in cross section, as plainly indicated in Fig. 2. On the shaft 20 within the cylinder 25 are mounted to rotate loosely the hubs 30 and 31 of two rotors 32 and 33, of which the rotor 32 is provided with heads 34, 35 fitting the working chamber 26 and extending diametrically from the peripheral face of the hub 30. The other rotor 33 is provided with similar heads 36, 37 fitting the working chamber 26 and extending from the peripheral face of the hub 31. The rotors 32 and 33 rotate intermittently and each rotor during its period of rest is locked in place until the rotation of keeper 40 or 41 carries the offset in the face thereof by the end of the locking bolt 42 or 43 and permits the ejection of said bolt from the locking recess in cam 46ª or 47ª, by the air pressure acting to advance the rotor, and forms an abutment to the expanding gases by being locked in place, and after the pressure of the air charge exceeds that of the expanding gases it forms an abutment to the air charge, its inertia, during acceleration to the angular velocity of the shaft being sufficient to supply the abutment necessary to complete the compression of the air charge.

In order to alternately connect the rotors 32 and 33 with the engine shaft 20 or to disconnect the same therefrom, use is made of locking and releasing mechanisms, one for each rotor and both alike in construction so that it suffices to describe but one in detail. On the shaft 20 are yieldingly mounted two collars or keepers 40 and 41, of which the keeper 40 is adapted to be connected by bolts 42 with the hub 30 of the rotor 32, and similar bolts 43 serve to connect the keeper 41 with the hub 31 of the rotor 33. The bolts 42 and 43 are mounted to slide longitudinally in bearings on the hubs 30 and 31 and rotate with the same, and the bolts 42 and 43 are provided with angular offsets 44 and 45 engaging cams 46 and 47 formed on the inner faces of the cylinder heads 23 and 24 to move the bolts 42 and 43 into unlocking position relative to the keepers 40 and 41. The bolts 42 and 43 are moved into locking position relative to the keepers 40 and 41 by the action of cams 46ª and 47ª against the round end of the bolts. The keepers 40 and 41 are yieldingly connected with the shaft 20 as above stated, and for this purpose use is made of collars 38 secured to the shaft 20 and on which the keepers 40 and 41 have a turning movement limited by lugs 39 formed on the keepers and engaging peripheral recesses 48 formed in the collars 38, as plainly shown in Fig. 5. Springs 49 are coiled on the shaft 20 and the outer ends of the springs 49 are secured to the shaft 20 and the inner ends of the said springs are attached to the keepers 40 and 41 thus yieldingly connecting the said keepers with the shaft 20. The springs 49 are compressed during the compression of the air charge and they permit the necessary angular displacement of the keepers 40 and 41 so that at full compression of the air charge by one rotor the other rotor will be in the engaging position. When a release of the rotor takes place the energy stored in the springs acts to rotate the corresponding keepers forward to the forward limits of the angular displacement. The energy stored in a spring 49 must be sufficient to give the surrounding keeper a velocity which will move it to its forward position prior to its rotor reaching the engaging position.

Figure 1:
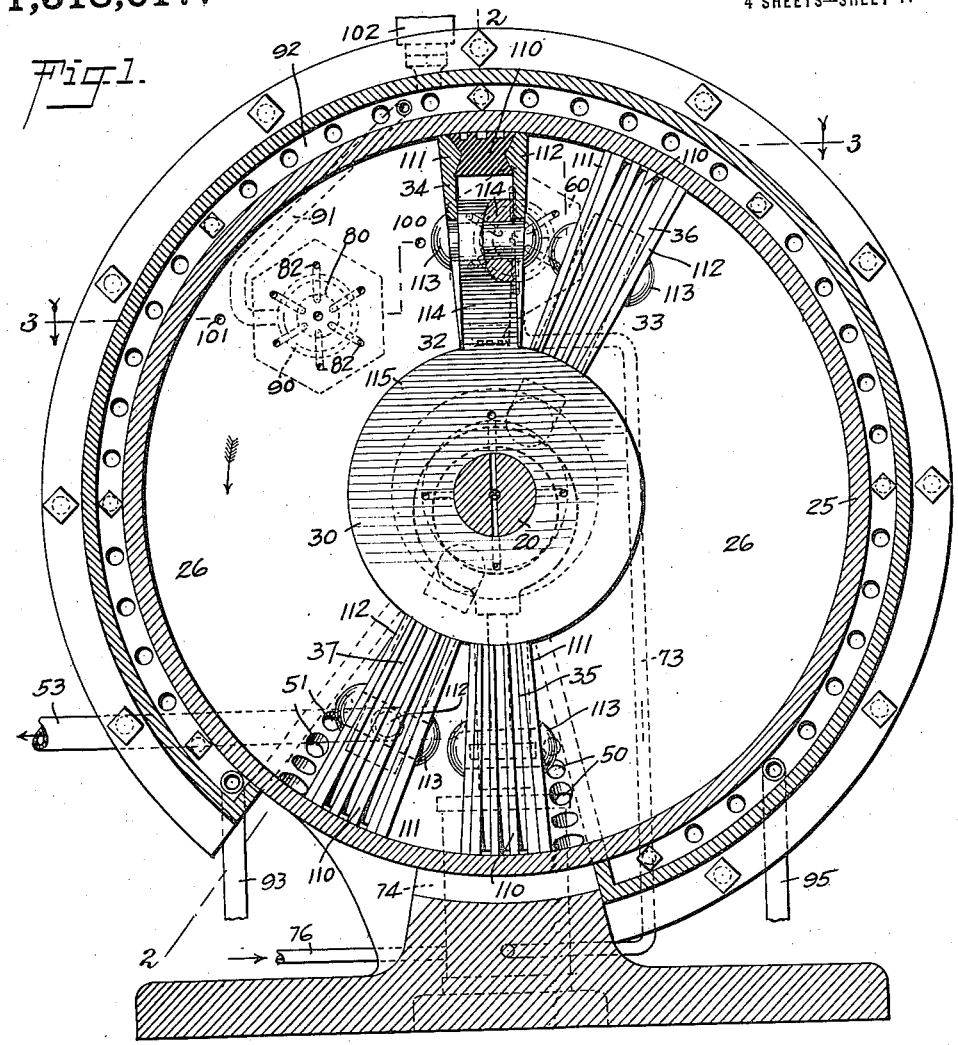
Figure 1 is a cross section of the rotary internal combustion engine, the section being on the line 1—1 of Fig. 2.

In running the engine, use is made of compressed air, gasolene or other hydrocarbon oil and highly heated water and steam, and for this purpose the following arrangement is made: The cylinder 25 is provided with a set of air admission ports 50 opening into the working chamber 26 at the lower portion thereof. The air admission ports 50 are located to the right of a rotor head when the latter is in lowermost position, as shown in Fig. 1. A set of exhaust ports 51 is located to the left of the rotor head when the latter is in the lowermost position of rest, as shown in Fig. 1. The exhaust ports 51 lead to a chamber 52 formed on the cylinder 25. The exhaust chamber 52 is provided with an exhaust pipe 53 for conducting the exhaust gases to a suitable place of discharge. An oil or gas admission valve 60 is arranged on one side of the cylinder 25 at the upper portion thereof, and this valve 60 is normally seated on a valve seat 61 formed in the cylinder 25, and from the seat 61 lead a number of small ports 62 into the working chamber 26. The valve 60 is mounted to slide in a valve casing 65 attached to the cylinder 25, and the valve 60 is provided with a valve stem 66 extending into a casing 67 containing a spring 68 pressing against a shoulder 69 formed on the stem 66 to normally hold the valve 60 against its seat 61 thus closing the ports 62. The valve casing 65 is provided with an annular chamber 70 adjacent the valve seat 61 and connected by ports 71 and 72 with a gas supply pipe 73 extending from a pump 74 driven by suitable mechanism 75 from the engine shaft 20. The pump 74 is provided with an inlet pipe 76 connected with a reservoir containing gasolene or other hydrocarbon oil to be pumped by the pump 74 into the annular chamber 70. The oil from this chamber 70 passes under pressure through the ports 62 into the working chamber 26 at the time the valve 60 is opened by pressure of the compressed air contained between the piston heads 34 and 36 or the piston heads 36 and 35 or the piston heads 35 and 37 or the piston heads 37 and 34 whenever said heads are in uppermost position. The regulation of the quantity of fuel admitted is obtained by limiting the opening of the valve 60 by manual adjustment of the casing 67 into the valve casing 65. It is understood that when the hydrocarbon oil is forced into the compressed air the latter ignites the same and a powerful explosive mixture is provided which exerts its pressure against the released rotor head, accelerating its travel forward in the working chamber 26 in the direction of the arrow $x$ indicated in Fig. 1.

In order to supply highly heated water or steam to the hot gases after the rotor head has advanced a desired distance, use is made of a water or steam admission valve 80 attached to one side of the cylinder 25 a distance in advance of the oil or admission valve 60. The valve 80 is similar to the valve 60 and is normally seated on a valve seat 81 forming one side of the cylinder 25, as plainly shown in Figs. 1 and 3. Small ports 82 connect the seat 81 with the interior of the working chamber 26. The valve 80 is mounted to slide in a suitable valve casing 85 attached to the cylinder head, and the valve 80 is provided with a valve stem 86 extending within a casing 87 containing a spring 88 pressing on the valve stem to hold the valve 80 normally to its seat 81. The valve casing 85 is provided with an annular chamber 90 surrounding the valve 80 adjacent the valve seat 81 and this chamber 90 is connected by a pipe 91 (see Fig. 1) with the top of a water jacket 92 surrounding the cylinder 25. One end of the water jacket 92 is connected by a pipe 93 with a pump 94 (see Fig. 7) for circulating water through the water jacket 90 and forcing a portion of said water after it is highly heated, by way of the pipe 91 into the annular chamber 90 from which the water can pass under pressure through the ports 82 into the working chamber 26 whenever the valve 80 is opened by the pressure of the hot gases within the cylinder and contained between the advancing rotor head and its corresponding abutment. The regulation of the quantity of water and steam admitted is obtained by limiting the opening of the valve 80, by manual adjustment of the casing 87, into the valve casing 85. The water jacket 92 is provided with an outlet pipe 95 for conducting the remaining water in the water jacket to a suitable place of discharge. The pump 94 is actuated by a suitable mechanism 96 from the engine shaft 20, and the said mechanism 96 also actuates a lubricating pump 97 for lubricating the engine shaft 20, as indicated in Figs. 2 and 7. Oil drain pipes 98 lead from the cylinder heads 21 and 23 to conduct surplus oil from the engine. By-passes 100 and 101 connect the valve chambers 65, 85 with the interior of the working chamber 26 at points in advance of the corresponding valves 60 and 80 (see Fig. 3). By the arrangement described, pressure from the working chamber can pass into the casings 65 and 85 to assist the spring 68 and 88 to reseat the valves 60 and 80. A safety valve 102 is connected with the water jacket 92 to release the latter of excess pressure.

The rotor heads 34, 35, 36 and 37 are alike in construction and it suffices to describe but one in detail. Each of the rotor heads is provided with a packing ring 110 fitting into the working chamber 26 and covered at its opposite faces by face plates 111 and 112 secured by a bolt 113 to a lug 114 extending radially from an annular flange 115 forming part of the corresponding hub 30 or 31, as plainly shown in Fig. 2. The packing ring 110 is split and the split ends are spaced apart and engage recesses 116 formed in the lug 114 to prevent leakage of the motive agent.

The operation is as follows:

When the several parts are in the position shown in Fig. 1 than a charge of compressed air from a previous operation in the working chamber 26 is between the rotor heads 34 and 36. At this time the rotor 33 is in the position of rest and locked therein to form an abutment while the other rotor 32 is now released and is caused to rotate in the direction of the arrow $x$ by the pressure of the compressed air against the rotor head 34. As the head 34 advances it uncovers the several ports 62 so that compressed air can pass through the ports 62 to the valve seat 61 thus forcing the valve 60 into open position whereby oil or gas under pressure is caused to flow from the chamber 70 through the ports 62 into the working chamber and into the compressed air to be ignited by the latter and thus produce a burning or explosive mixture. The pressure exerted by this burning mixture gives an impulse to the rotor head 34 which finally passes the by-pass 100 thus allowing pressure to pass into the valve casing 65 with a view to reseat the valve 60 on its seat 61 thereby shutting off the oil or gas supply. The head 34 in its further travel passes the ports 82 whereby the pressure within the annular chamber 26 moves the valve 80 into open position against the tension of its spring 88 whereby heated water from the jacket 92 passes by way of the pipe 91, the annular chamber 90, the open valve seat 81 and the ports 82 into the working chamber 26 to be converted into steam by the hot gases contained between the advancing head 34 and the abutment head 36. The rotor head 34 in its further advance finally passes the by-pass 101 whereby pressure from the annular working chamber 26 passes into the valve casing 85 to return the valve 80 to its seat thus shutting off the water supply to the working chamber 26. During the travel of the rotor 32 as described its head 35 passes the air admission ports 50 and then this head begins to compress the air in the working chamber 26 between the advancing head 35 and the stationary head 36, and when the desired degree of rotation has occurred the rotor 33 is unlocked by its locking bolt 43 and the heads 36, 37 move into vertical position by the action of the air being compressed behind it, and during this movement the head 34 of the rotor 32 passes the exhaust ports 51 thus allowing the exhaust gases contained in the working chamber 26 between the heads 34, 36 to escape to a suitable place of discharge. It will be noticed that when the heads 34 and 35 of the rotor 32 reach the position of the heads 36, 37 of the rotor 33, as shown in Fig. 1, then the heads 36 and 37 of the rotor 33 are in the vertical position, that is, in the position of the heads 34, 35, shown in Fig. 1. The above described operation is now repeated with the difference that the rotor 33 receives the impulse while the rotor 32 is locked in place and forms an abutment. It is understood that the rotary motion given intermittently to the rotors 32, 33 is transmitted by the latter to the engine shaft 20 by the use of the bolts 42, 43, the keepers 40 and 41 and the lugs 39. It will also be noticed that two impulses are given successively to the rotors during each revolution of the engine shaft 20 to insure a steady running of the engine. From the foregoing it will also be seen that the air charge is mainly compressed between moving pistons and that the effective energy of compression in the air charge is equal to the kinetic energy of the moving rotor, when the said rotor has attained the angular velocity of the normally rotating engine shaft, thus practically providing a balanced energy engine.

It will be noticed that in starting the rotor, which is unlocked, energy is supplied from the engine by the air being compressed behind it, hence it acts as an abutment to the air and its inertia is sufficient at full speed of the engine to give the required compression to the air. The energy used in bringing this rotor up to speed though taken from the moving engine is stored in the compressed air where it will be returned to the engine as soon as it is free to expand. As the advancing rotor is released from the shaft it advances against the compressed air charge and exhausts its energy in completing the compression, at which time it is locked against recoil.

In compressing the air charge a sufficiently high temperature is attained to insure immediate and rapid ignition and combustion of the fuel as soon as the latter is admitted. Since this temperature is far above the practicable working temperature of the metal of the engine the water jacket 92 is provided to remove the heat from the metal that is given up to it by the air and gases. Now instead of removing the heat from the water by cooling it in a radiator as now generally practised, the water is allowed to become superheated, say until an absolute pressure of about 135 lbs. per square inch is obtained. This pressure corresponds to a temperature of the water of about 350° F. The superheated water is now admitted to the expanding hot gases, the pressure of which has fallen considerably to that of the water and as soon as the valve 80 opens some of the superheated water under the influence of the lower pressure is converted into steam and passes in jets through the diverging ports 82 into the working chamber 26 to be distributed through the hot gases. Small drops of water are carried along with the steam. The weight of water admitted is such that in cooling the hot gases and surrounding cylinder to about 650° F. the water and steam admitted will be formed into superheated steam having a temperature of about 650° F. The resulting pressure of the mixture of gas and steam is higher than the pressure of the hot gases before the admission of the water. The water in attaining a temperature of 650° F. expands about 288 times. The reduction in pressure of the burning mixture is proportionate to the reduction of the absolute temperature.

When the engine shaft 20 is running at a speed below a normal speed then the unlocked rotor moves relatively faster than the engine shaft and arrives with its bolt in locking position prior to its keeper being in position to receive it and hence such rotor must stop until the moving keeper is in engaging position. When the engine shaft is running at a speed above the normal speed then the free rotor moves relatively slower than the engine shaft and the moving keeper overtakes the rotor and engages the outer end of the bolt and assists the rotor forward to the engaging position at which time the locking takes place. When the engine shaft is running at a normal speed the corresponding keeper makes contact with its bolt just before they arrive in the engaging position.

Having thus described my invention, I claim as new and desire to secure by Letters Patent:—

1. A rotary internal combustion engine, comprising a cylinder, rotors therein and each having rotor heads adapted to become abutments, means to admit air into the cylinder to be compressed between an advancing rotor and a stationary or moving abutment rotor, and means to admit an explosive charge into the compressed air for the latter to ignite the said explosive charge.

2. A rotary internal combustion engine, comprising a cylinder, rotors therein, and each having rotor heads adapted to become abutments, means to admit air into the cylinder to be compressed between an advancing rotor and a stationary or moving abutment rotor, means to lock the advancing rotor in place after exhausting its kinetic energy against the compressed air charge, means to release the other rotor for the latter to become an advancing rotor, and means to admit an explosive charge into the compressed air for the latter to ignite the explosive charge and force the rapidly advancing released rotor forward.

3. A rotary internal combustion engine, comprising a cylinder, rotors therein and each having rotor heads adapted to become abutments, means to admit air into the cylinder to be compressed between an advancing rotor and a stationary or moving abutment rotor, means to lock the advancing rotor in place after exhausting its energy against the compressed air charge, means to release the other rotor for the latter to become an advancing rotor, means to release the other abutment rotor for the latter to become an advancing rotor, means to admit an explosive charge into the compressed air for the latter to ignite the explosive charge and force the rapidly advancing released rotor forward, and means to admit water and steam into the exploded charge during the advance of the rotor.

4. A rotary internal combustion engine, comprising a cylinder, rotors therein and each having rotor heads adapted to become abutments, means to admit air into the cylinder to be compressed between an advancing rotor and a stationary or moving abutment rotor, means to lock the advancing rotor in place after exhausting its energy against the compressed air charge, means to release the other rotor for the latter to become an advancing rotor, means to admit an explosive charge into the compressed air for the latter to ignite the explosive charge and force the rapidly advancing released rotor head forward, means to admit water and steam into the exploded charge during the advance of the rotor, and means to manually regulate the quantity of fuel admitted.

5. A rotary internal combustion engine, comprising a cylinder, rotors therein and each provided with alternately acting rotor and abutment members, means for admitting air into the cylinder to be compressed by the head of one rotor against the heads of the other rotor, means to admit an explosive charge into the compressed air for the latter to ignite the explosive charge and force one rotor forward, and means to admit steam and water into the exploded charge during the advance of the said rotor.

6. A rotary internal combustion engine, comprising a cylinder, rotors therein and each provided with alternately acting rotor and abutment members, means for admitting air into the cylinder to be compressed by one rotor against the other rotor, means to admit an explosive charge into the compressed air for the latter to ignite the explosive charge and force one rotor forward, means to admit steam and water into the exploded charge during the advance of the said rotor, and means to manually regulate the quantity of steam and water admitted.

7. A rotary internal combustion engine, comprising a cylinder having an annular working chamber, an engine shaft, at least two rotors having hubs mounted to turn loosely on the said shaft, each rotor having diametrically opposite heads fitting the said working chamber, the said rotors being adapted to alternately form abutments, annular keepers secured on the said shaft, fixed cams, and bolts slidable on the said rotor hubs and controlled by the said fixed cams to engage the said keepers to alternately connect the rotors with the said shaft.

8. A rotary internal combustion engine, comprising a cylinder having an annular working chamber, rotors in the said cylinder and each having rotor heads adapted to become abutments, means for alternately locking and releasing the rotors for one to advance and the other becoming an abutment, means to admit air into the working chamber to be compressed between differently advancing rotors, a pressure actuated fuel supply valve in advance of the said air admission means and connected with the working chamber, and a pump forcing the fuel through the valve into the compressed air.

9. A rotary internal combustion engine, comprising a cylinder having an annular working chamber, rotors in the said cylinder and each having rotor heads adapted to become abutments, means for alternately locking and releasing the rotors for one to advance and the other becoming an abutment, means to admit air into the working chamber to be compressed between differently advancing rotors, a pressure actuated fuel supply valve in advance of the said air admission means and connected with the working chamber, a pump forcing the fuel through the valve into the compressed air, a water jacket for the said cylinder, a pressure actuated water or steam supply valve in advance of the said fuel supply valve connected with the said water jacket, and a pump connected with the said water jacket for circulating water therethrough and forcing a portion of the water into and through the said water or steam supply valve into the exploded charge in the working chamber.

10. A rotary internal combustion engine, comprising a cylinder having an annular working chamber, and a rotor in the said cylinder and having a hub, a lug extending radially from the peripheral face of the hub, a split packing ring fitting the said annular chamber and having its split engaging the said lug, face plates for the said ring, and a bolt engaging the said face plates and the said lug to fasten the packing ring and face plates in position on the lug to form a rotor head.

11. A rotary internal combustion engine, comprising a cylinder, an engine shaft, rotors in the said cylinders, means connecting the said rotors yieldingly with the said engine shaft, means to admit air into the cylinders to be compressed between an advancing rotor and a stationary or advancing abutment rotor, and means to admit an explosive charge into the compressed air for the latter to ignite the said explosive charge.

12. A rotary internal combustion engine, comprising a cylinder, an engine shaft, rotors in the said cylinders, collars secured on the said engine shaft, keepers having a limited rotary motion on the said collars, springs connecting the said engine shaft with the said keepers, and locking bolts slidable on the rotors and adapted to lock the said keepers to the said rotors.

13. A rotary internal combustion engine comprising a cylinder, an engine shaft, rotors in the said cylinders, collars secured on the said engine shaft, keepers having a limited rotary motion on the said collars, springs connecting the said engine shaft with the said keepers, locking bolts slidable on the rotors and adapted to lock the said keepers to the said rotors, and fixed cams controlling the said bolts.

14. A rotary internal combustion engine comprising a cylinder, an engine shaft, rotors in the said cylinders, collars secured on the said engine shaft, keepers mounted to turn on the said collars and having lugs engaging recesses in the said collars to limit the turning movement of the keepers on the collars, springs connecting the said engine shaft with the said keepers, locking bolts slidable on the hubs of the rotors and adapted to lock the said keepers to the said rotors, and fixed cams controlling the said bolts.

KELLER SHANK.